US009965224B2

(12) United States Patent
Pendharkar et al.

(10) Patent No.: US 9,965,224 B2
(45) Date of Patent: May 8, 2018

(54) SYSTEMS AND METHODS FOR ENABLING REPLICATION TARGETS TO RECLAIM UNUSED STORAGE SPACE ON THIN-PROVISIONED STORAGE SYSTEMS

(75) Inventors: Niranjan Pendharkar, NCL (IN); Shailesh Vaman Marathe, Maharashtra (IN); Venkata Tatavarty, Sunnyvale, CA (US)

(73) Assignee: Veritas Technologies LLC, Mountain View, CA (US)

(*) Notice: Subject to any disclaimer, the term of this patent is extended or adjusted under 35 U.S.C. 154(b) by 1438 days.

(21) Appl. No.: 12/712,186

(22) Filed: Feb. 24, 2010

(65) Prior Publication Data
US 2011/0208931 A1 Aug. 25, 2011

(51) Int. Cl.
*G06F 12/00* (2006.01)
*G06F 3/06* (2006.01)
(52) U.S. Cl.
CPC ............ *G06F 3/0665* (2013.01); *G06F 3/067* (2013.01); *G06F 3/0608* (2013.01)
(58) Field of Classification Search
None
See application file for complete search history.

(56) References Cited

U.S. PATENT DOCUMENTS

| 5,506,983 | A | * | 4/1996 | Atkinson et al. | ............. 707/703 |
| 6,779,093 | B1 | * | 8/2004 | Gupta | ............................. 711/162 |
| 2005/0055492 | A1 | | 3/2005 | Muthulingam et al. | |
| 2006/0259723 | A1 | * | 11/2006 | Petruzzo | ........................ 711/162 |
| 2007/0113004 | A1 | * | 5/2007 | Sugimoto et al. | ............ 711/112 |
| 2007/0266037 | A1 | | 11/2007 | Terry et al. | |
| 2008/0085471 | A1 | | 4/2008 | Anderson et al. | |
| 2008/0320061 | A1 | | 12/2008 | Aszmann et al. | |
| 2009/0077327 | A1 | | 3/2009 | Hara | |
| 2009/0089516 | A1 | * | 4/2009 | Pelts et al. | ..................... 711/154 |
| 2009/0248763 | A1 | | 10/2009 | Ranjan et al. | |
| 2012/0210087 | A1 | | 8/2012 | Sugimoto et al. | |

FOREIGN PATENT DOCUMENTS

| EP | 2104028 | 9/2009 |
| WO | WO 2008/061892 | 5/2008 |

OTHER PUBLICATIONS

International Search Report and Written Opinion received in PCT Application No. PCT/US2010/060525 dated Mar. 25, 2011.

* cited by examiner

*Primary Examiner* — Daniel D Tsui
(74) *Attorney, Agent, or Firm* — FisherBroyles LLP (57) ABSTRACT

A computer-implemented method for enabling replication targets to reclaim unused storage space on thin-provisioned storage systems may include: 1) replicating data from a replication source to a replication target, 2) identifying unused storage space within the replicated data, 3) generating a reclamation request for reclaiming the unused storage space from a thin-provisioned storage system that provides thin-provisioned storage for the replication target, and then 4) issuing the reclamation request to the thin-provisioned storage system in order to reclaim the unused storage space from the thin-provisioned storage system. Various other related systems, methods, and configured computer-readable media are also disclosed.

15 Claims, 6 Drawing Sheets

SYSTEMS AND METHODS FOR ENABLING REPLICATION TARGETS TO RECLAIM UNUSED STORAGE SPACE ON THIN-PROVISIONED STORAGE SYSTEMS

BACKGROUND

Many organizations rely upon data replication to improve the reliability, fault-tolerance, and/or accessibility of their applications and/or data. Data replication typically involves replicating (e.g., in a passive or active manner) data from a primary site or device (such as an application server) to a secondary (i.e., backup) site or device (also known as a "replication target").

Due to the high volumes of data generated during data replication, providers of data-replication services have long sought to maximize data storage performance while minimizing the cost of storage. Because of this, some providers have turned to thin-provisioning solutions in an effort to efficiently utilize available storage space. Thin-provisioning solutions typically allocate storage space from a common pool to computing systems on an as-needed or just-in-time basis in an effort to prevent storage space from going to waste.

Unfortunately, typical file or block-level replication techniques may prevent replication targets from identifying free or unused portions within data replicated from a primary site (such as an application server). For example, a replication target may be unable to interpret application or file-system data received from a primary site without access to the various application and/or file-system APIs used by the primary site when generating the data. Without this knowledge, the replication target may be unable to effectively utilize a thin-provisioned storage system for storing the replicated data since the replication target will be unable to identify (and subsequently instruct the thin-provisioned storage system to reclaim) free or unused storage space within the replicated data stored on the thin-provisioned storage system.

SUMMARY

As will be described in greater detail below, the instant disclosure generally relates to systems and methods for enabling replication targets to reclaim unused storage space on thin-provisioned storage systems. In one example, one or more of the various systems described herein may accomplish such a task by: 1) replicating data from a replication source (such as a server) to a replication target (using, e.g., file or block-level replication techniques), 2) identifying unused storage space within the replicated data (using one or more of the methods described herein), 3) generating a reclamation request for reclaiming the unused storage space from a thin-provisioned storage system that provides thin-provisioned storage for the replication target, and then 4) issuing the reclamation request to the thin-provisioned storage system in order to reclaim the unused storage space from the thin-provisioned storage system.

The systems described herein may identify unused storage space within replicated data in a variety of ways and in a variety of contexts. In one example, the replication target may identify unused storage space within the replicated data by receiving (via, e.g., an in-band communication protocol) information from the replication source that identifies the unused storage space. In some examples, this free-space information may include an intercepted reclamation request originally sent from the replication source to a thin-provisioned storage system that provides thin-provisioned storage for the replication source. In other examples, this free-space information may identify storage space freed by a computing operation (such as a defragment operation or file-removal operation) performed at the replication source.

In some examples, the replication target may receive this free-space information from the replication source in response to a request issued by the replication target. For example, the replication target may request (and the replication source may correspondingly provide) free-space information on a periodic basis and/or as-needed basis.

In another example, the replication target may identify unused storage space within the replicated data by: 1) suspending data replication and then 2) using a data-management API (such as a file-system and/or application API) to independently identify unused storage space within the replicated data. Upon reclaiming this unused storage space, the replication target may instruct the replication source to resume data replication.

As will explained in greater detail below, the systems and methods described herein may enable a replication target to reclaim unused storage space from a thin-provisioned storage system that provides thin-provisioned storage for the replication target. As such, these systems and methods may enable system administrators to deploy replication solutions within thin-provisioned storage environments, resulting in potential space and monetary savings.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
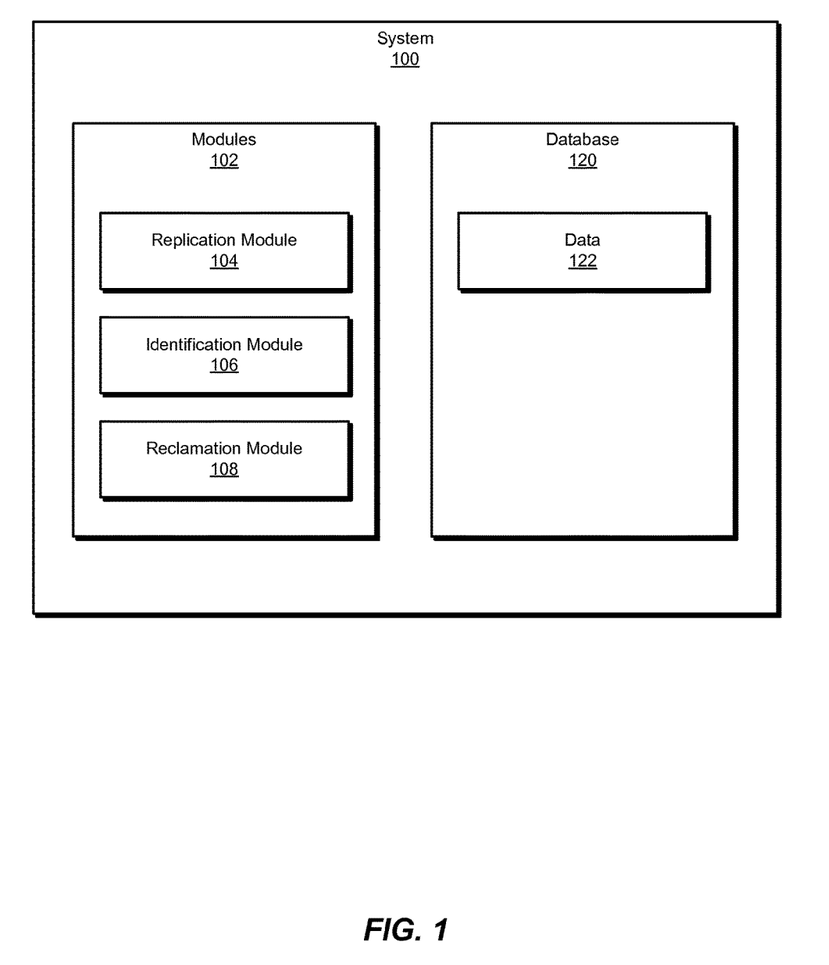
FIG. 1 is a block diagram of an exemplary system for enabling replication targets to reclaim unused storage space on thin-provisioned storage systems.
Figure 2:
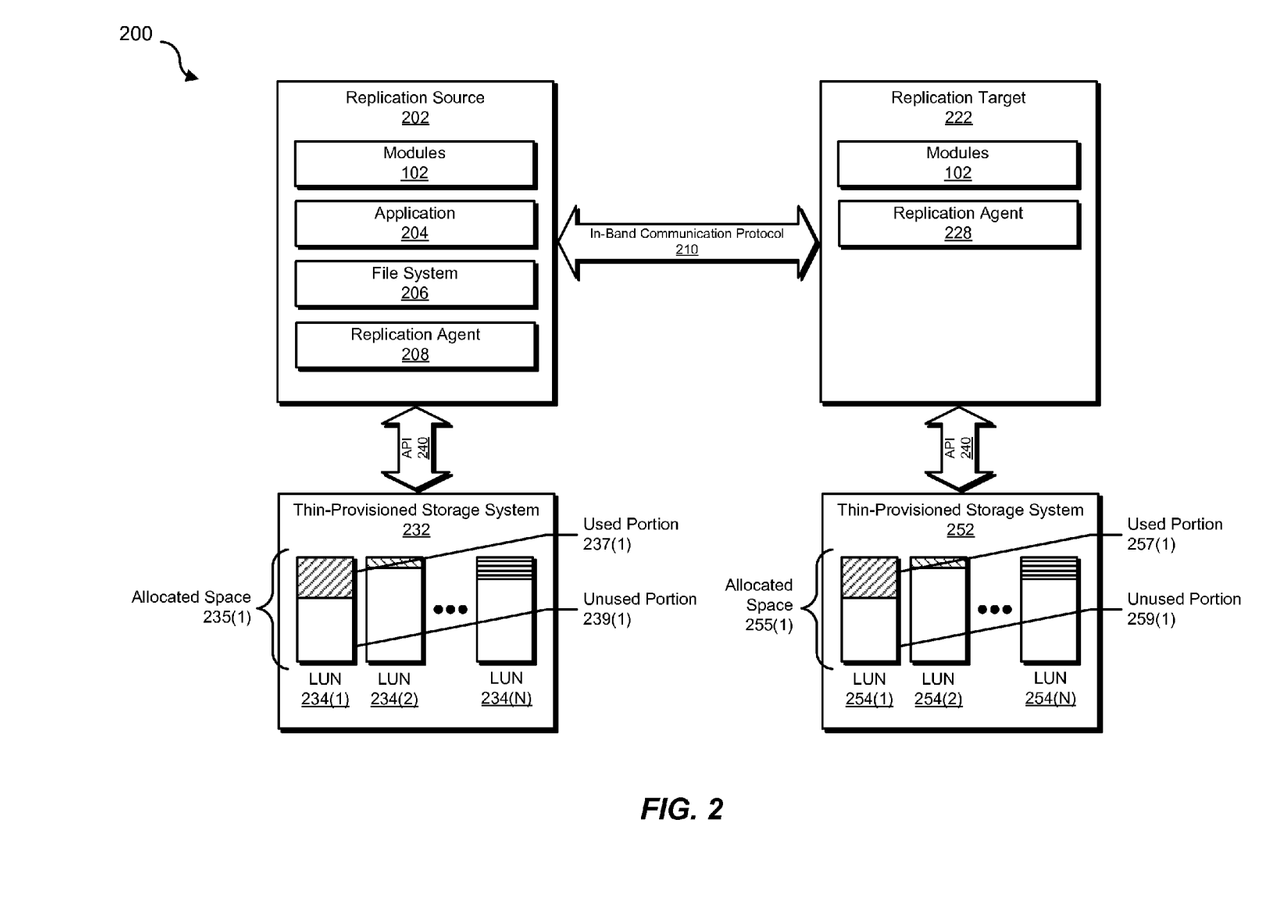
FIG. 2 is a block diagram of an exemplary system for enabling replication targets to reclaim unused storage space on thin-provisioned storage systems.
Figure 3:
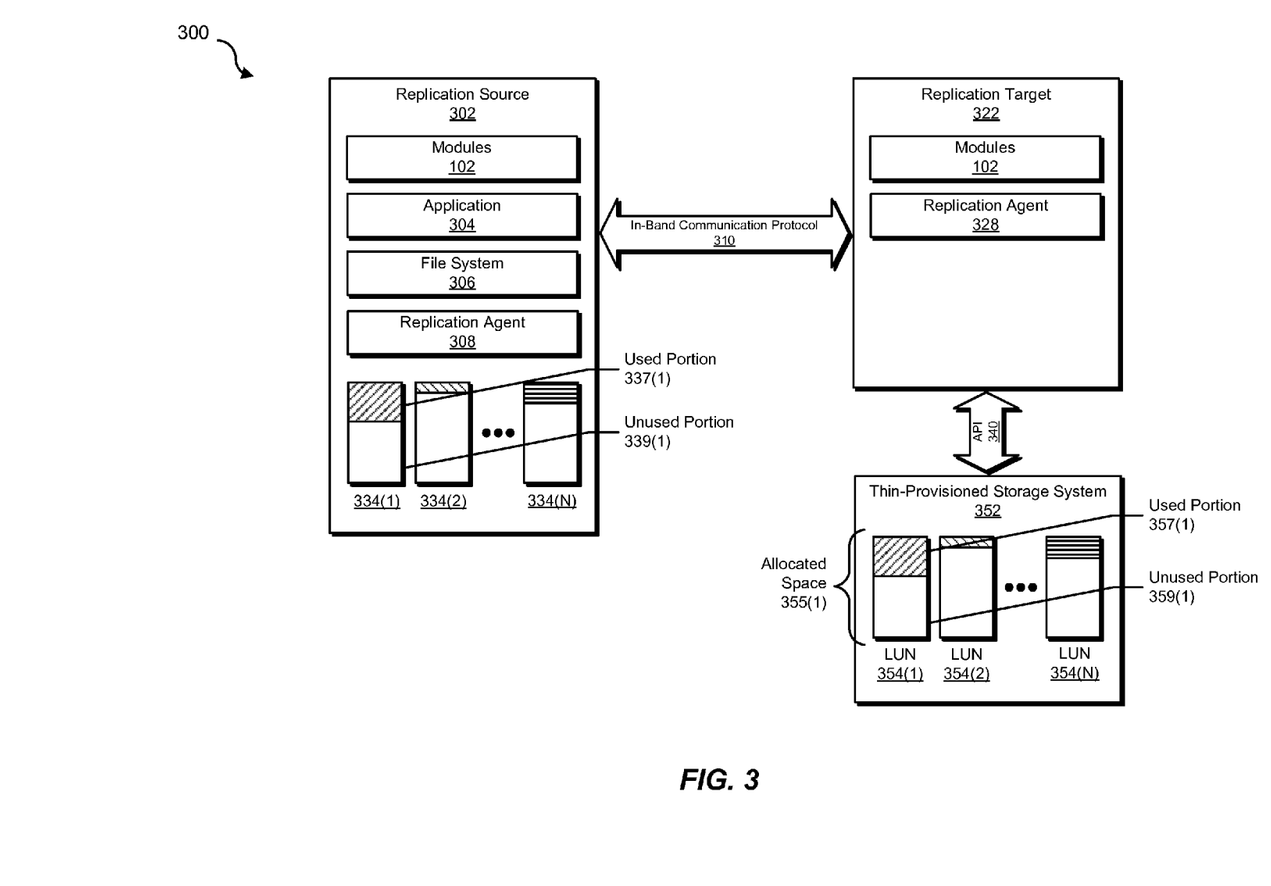
FIG. 3 is a block diagram of an additional exemplary system for enabling replication targets to reclaim unused storage space on thin-provisioned storage systems.

The following will provide, with reference to FIGS. 1-3, detailed descriptions of exemplary systems for enabling replication targets to reclaim unused storage space on thin-provisioned storage systems. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for enabling replication targets to reclaim unused storage space on thin-provisioned storage systems. As illustrated in this figure, exemplary system 100 may include one or more modules 102 for performing one or more tasks. For example, and as will be explained in greater detail below, exemplary system 100 may include a replication module 104 programmed to replicate data from a replication source to a replication target. Exemplary system 100 may also include an identification module 106 programmed to identify unused storage space within the replicated data.

In addition, and as will be described in greater detail below, exemplary system 100 may include a reclamation module 108 programmed to reclaim the unused storage space from a thin-provisioned storage system that provides storage space for the replication target. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., replication source 202 and/or replication target 222), the devices illustrated in FIG. 3 (e.g., replication source 302 and/or replication target 322), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include data 122 (stored, e.g., on a replication source) to be replicated from the replication source to a replication target. Database 120 may represent portions of a single database or computing device or a plurality of databases or computing devices. For example, database 120 may represent a portion of the devices illustrated in FIG. 2 (e.g., replication source 202 and/or replication target 222), the devices illustrated in FIG. 3 (e.g., replication source 302 and/or replication target 322), computing system 510 in FIG. 5, and/or portions of exemplary network architecture 600 in FIG. 6. Alternatively, database 120 in FIG. 1 may represent one or more physically separate devices capable of being accessed by a computing device, such as the devices illustrated in FIG. 2 (e.g., replication source 202 and/or replication target 222), the devices illustrated in FIG. 3 (e.g., replication source 302 and/or replication target 322), computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a replication source 202 in communication with a replication target 222. In this example, a thin-provisioned storage system 232 may provide thin-provisioned storage space (e.g., allocated space 235(1)) for replication source 202. Similarly, an additional thin-provisioned storage system 252 may provide thin-provisioned storage space (e.g., allocated space 255(1)) for replication target 222.

In one embodiment, and as will be described in greater detail below, one or more of modules 102 from FIG. 1 may enable replication target 222 to reclaim unused storage space on thin-provisioned storage system 252 by: 1) receiving replicated data from a replication source (e.g., replication source 202), 2) identifying (using, e.g., one of the various techniques described herein) unused storage space within the replicated data (e.g., unused portion 259(1) of allocated space 255(1)), 3) generating a reclamation request for reclaiming the unused storage space from a thin-provisioned storage system that provides thin-provisioned storage for the replication target (e.g., thin-provisioned storage system 252), and then 4) issuing the reclamation request to the thin-provisioned storage system in order to reclaim the unused storage space from the thin-provisioned storage system.

Replication source 202 generally represents any type or form of computing device capable of replicating data to a replication target. Examples of replication source 202 include, without limitation, application servers and database servers configured to provide various database services and/or run certain software applications, exemplary computing system 510 in FIG. 5, or any other suitable computing device. Similarly, replication target 222 generally represents any type or form of computing device capable of receiving and storing replicated data. In one example, replication source 202 may replicate data and/or send metadata regarding replicated data to replication target 222 via an in-band communication protocol 210.

As illustrated in FIG. 2, in some examples replication source 202 may include an application 204. Application 204 generally represents any type or form of application capable of generating and/or managing data (such as, e.g., a database). In some examples, application 204 may store data within a thin-provisioned storage system (such as thin-provisioned storage system 232) and/or a local storage device (as explained below in connection with FIG. 3).

Replication source 202 may also include a file system 206. In some examples, file system 206 may contain a plurality of thin-provisioned volumes (i.e., logical volumes backed by storage on a thin-provisioned storage system, such as thin-provisioned storage system 232). Replication source 202 may also include a replication agent 208 for replicating data from replication source 202 to replication target 222. Replication agent 208 generally represents any type or form of host or server-side agent or module capable of replicating data from a replication source (such as replication source 202) to a replication target (such as replication target 222). As will be explained in greater detail below, replication agent 208 may replicate data using either file-level or block-level replication techniques.

Similarly, replication agent 228 on replication target 222 may represent any type or form of client-side agent or module capable of receiving replicated data from a replication source (such as replication source 202). As will be explained in greater detail below, in some examples application 204, file system 206, replication agent 208, and/or replication agent 228 may include one or more of modules 102 from FIG. 1.

Thin-provisioned storage systems 232 and 252 generally represent any type or form of storage system or device (such as a disk array) capable of storing data for a computing system on an as-needed and/or just-in-time basis. In one example, thin-provisioned storage systems 232 and 252 may be logically divided into a plurality of logical unit numbers (LUNs) (e.g., LUNs 234(1)-(N) and 254(1)-(N), respectively), each of which may represent a logical reference to a physical portion of thin-provisioned storage systems 232 or 252. LUNs 234(1)-(N) and 254(1)-(N) may represent a disk, a section of a disk, an entire disk array, and/or a section of a disk array within thin-provisioned storage systems 232 or 252. In some examples, thin-provisioned storage system 232 may provide thin-provisioned storage for one or more applications or file systems of replication source 202 (e.g., application 204 and/or file system 206).

In some examples, replication source 202 and/or replication target 222 may interface with thin-provisioned storage systems 232 and 252, respectively, via an API 240. API 240 generally represents any type or form of programming interface for interfacing with a thin-provisioned storage system.

In some examples, and in contrast to FIG. 2, the replication source may not utilize thin-provisioned storage. For example, replication source 302 in FIG. 3 may replicate data stored within one or more local storage devices (e.g., data sets 334(1)-(N)) to replication target 322 via in-band communication protocol 310. In this example, data sets 334(1)-(N) may contain data generated and/or managed by applications or file systems (such as application 304 and/or file system 306) at replication source 302. As with exemplary system 200 in FIG. 2, thin-provisioned storage system 352 may provide thin-provisioned storage for replication target 322.

Figure 4:
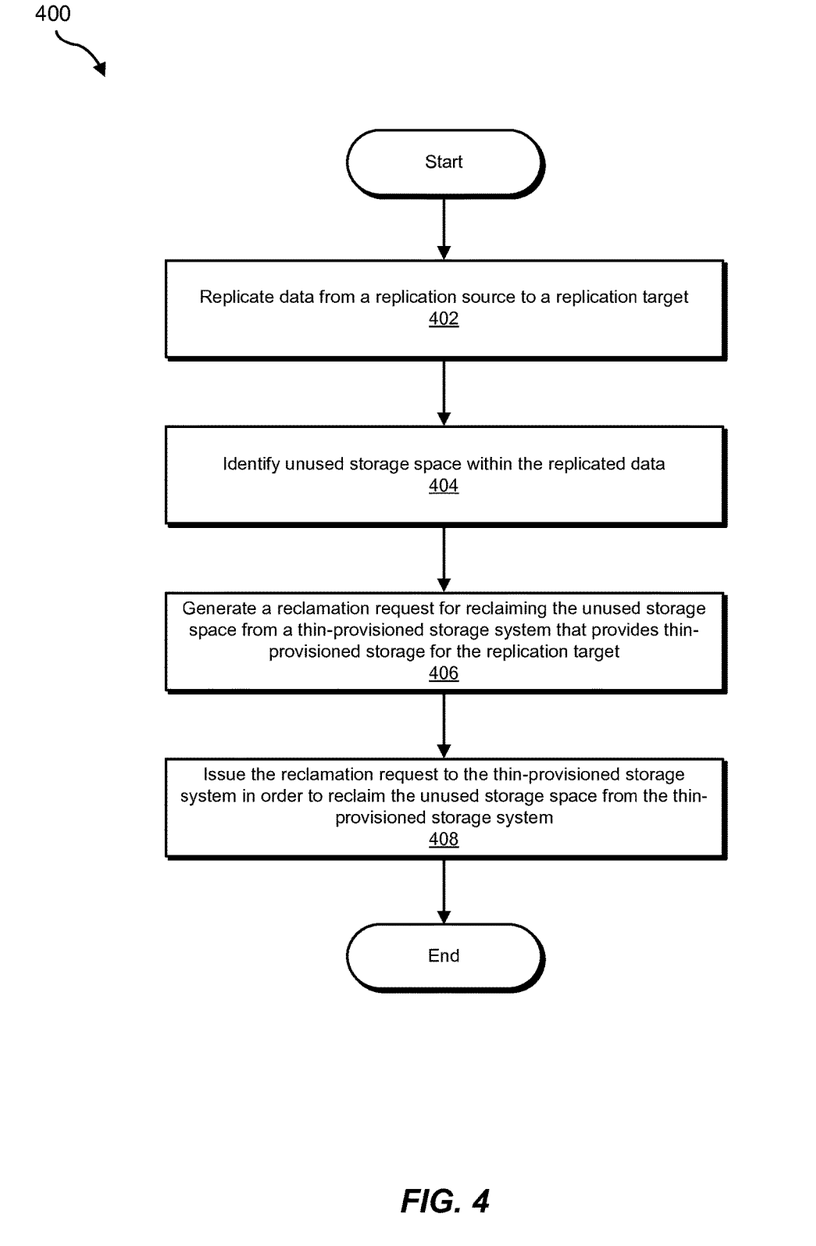
FIG. 4 is a flow diagram of an exemplary method for enabling replication targets to reclaim unused storage space on thin-provisioned storage systems.

FIG. 4 is a flow diagram of an exemplary computer-implemented method 400 for enabling replication targets to reclaim unused storage space on thin-provisioned storage systems. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 510 in FIG. 5, and/or portions of exemplary network architecture 600 in FIG. 6.

As illustrated in FIG. 4, at step 402 one or more of the various systems described herein may replicate data from a replication source to a replication target. For example, replication module 104 in FIG. 1 may, as part of replication source 202 in FIG. 2 (e.g., as part of replication agent 208), replicate data from replication source 202 to replication target 222.

The systems described herein may replicate data using any of a variety of replication techniques. For example, replication agent 208 may replicate data from replication source 202 to replication target 222 using block-based replication techniques (i.e., replication agent 208 may identify data to be replicated at the block level) and/or file-based replication techniques (i.e., replication agent 208 may identify data to be replicated at the file level).

In some examples, the systems described herein may replicate data using server or host-based replication techniques, as opposed to disk-based replication techniques. For example, replication agent 208 may execute on replication source 202, as opposed to executing on storage utilized by replication source 202 (such as thin-provisioned storage system 232).

In some examples, the data replicated in step 402 may represent data stored and/or managed by an application and/or file system. For example, replication agent 208 may replicate data stored and/or managed by a database application, such as application 204. Additionally or alternatively, replication agent 208 may replicate one or more volumes of a file system, such as file system 206.

The systems described herein may replicate data that is locally stored and/or stored on a thin-provisioned storage system. For example, in the example illustrated in FIG. 2, replication agent 208 may replicate data stored on thin-provisioned storage system 232 (e.g., replication agent 208 may replicate data allocated to replication source 202 within LUN 234(1) of thin-provisioned storage system 232 to replication target 222). Similarly, replication agent 308 in FIG. 3 may replicate a locally stored data set 334(1) from replication source 302 to replication target 322.

Returning to FIG. 4, at step 404 the systems described herein may identify unused storage space within the replicated data. For example, identification module 106 in FIG. 1 may, as part of replication source 202 and/or replication target 222 (e.g., as part of application 204, file system 206, replication agent 208, and/or replication agent 228), identify unused storage space within the data replicated from replication source 202 to replication target 222. Similarly, identification module 106 may, as part of replication source 302 and/or replication target 322 in FIG. 3 (e.g., as part of application 304, file system 306, replication agent 308, and/or replication agent 328), identify unused storage space within the data replicated from replication source 302 to replication target 322.

The systems described herein may identify unused storage space within replicated data in a variety of ways and in a variety of contexts. For example, all or portions of step 404 may be performed by the replication source, the replication target, or combinations of the same.

For example, replication target 222 may perform step 404 by receiving information from replication source 202 that identifies unused storage space within the data replicated from replication source 202. For example, identification module 106 may, as part of application 204, file system 206, and/or replication agent 208 on replication source 202 in FIG. 2: 1) identify (using, e.g., application or file-system APIs) an unused portion 239(1) of storage space within allocated space 235(1) and then 2) transmit information that identifies this unused storage space to replication target 222. Similarly, identification module 106 may, as part of application 304, file system 306, and/or replication agent 308 on replication source 302 in FIG. 3: 1) identify (using, e.g., application or file-system APIs) an unused portion 339(1) of data set 334(1) and then 2) transmit information that identifies this unused storage space to replication target 322.

In some examples, identification module 106 may transmit this free-space information from the replication source to the replication target via an in-band communication protocol, such as in-band communication protocol 210 in FIG. 2. The phrase "in-band communication protocol," as used herein, may refer to any type or form of communication mechanism that may transfer both replicated data and metadata associated with this replicated data within the same communication band. An example of an in-band communication protocol includes, without limitation, the IBC API used by VERITAS VOLUME REPLICATOR.

In some examples, replication target 222 may receive free-space information from replication source 202 in response to a request issued by replication target 222. For example, identification module 106 may, as part of replication target 222: 1) request free-space information from replication source 202 and then 2) receive this free-space information from replication source 202. Replication target 222 may request this information from replication source 202 in a variety of contexts, including, for example, on a periodic basis and/or on an as-needed basis.

In some examples, the free-space information received from the replication source may represent an intercepted reclamation request originally sent (via, e.g., a thin-provisioning API) from the replication source to a thin-provisioned storage system that provides thin-provisioned storage for the replication source. For example, identification module 106 may, (as part for, e.g., replication agent 208 on replication source 202) intercept a reclamation request issued by application 204 and/or file system 206 to thin-provisioned storage system 232 via API 240 to reclaim unused portion 239(1) of allocated space 235(1). Upon intercepting this reclamation request, identification module 106 may transmit the same to replication target 222 via in-band communication protocol 210. Replication target 222 may then use this intercepted reclamation request to identify unused storage space within the data replicated from replication source 202.

In some examples, the free-space information received from the replication source may identify storage space freed by a computing operation performed at the replication source. For example, identification module 106 may, as part of application 304, file system 306, and/or replication agent 308 on replication source 302 in FIG. 3, identify storage space (e.g., unused portion 339(1) of data set 334(1)) freed by a computing operation performed by application 304 and/or file system 306. Identification module 106 may then transmit information that identifies the storage space freed by the computing operation (e.g., unused portion 339(1)) to replication target 322 via in-band communication protocol 310.

In the above example, the phrase "computing operation" may refer to any type or form of computing operation capable of freeing space within a storage system. Examples of such computing operations include, without limitation, defragment operations, file-removal operations, or the like. Such operations may be performed by applications (such as application 304), file systems (such as file system 306), or the like.

In another example, a replication target may identify unused storage space within replicated data in step 404 by: 1) suspending data replication and then 2) using a data-management API to identify unused storage space within the replicated data. For example, replication module 104 in FIG. 1 may, as part of replication target 222 in FIG. 2 (e.g., as part of replication agent 228), instruct replication source 202 (via, e.g., in-band indication protocol 210) to suspend or pause the replication of data from replication source 202 to replication target 222. Upon receiving this instruction, replication agent 208 (which may include, as detailed above, replication module 104 from FIG. 1) may cause the replicated data at replication source 202 to enter into a consistent state. For example, replication agent 208 may freeze or suspend the operation of application 204 and/or file system 206, thus ensuring that the storage allocated to replication source 202 within thin-provisioned storage system 232 (e.g., allocated space 235(1)) is in an consistent state. Replication agent 208 may then send a communication from replication source 202 to replication target 222 (via, e.g., in-band communication protocol 210) that indicates that the replicated data (in this example, the storage allocated to replication source 202 by thin-provisioned storage system 232) is in an consistent state.

Upon receiving this communication from replication source 202, replication target 222 may: 1) refrain from applying all pending replication writes and then 2) use a data-management API to identify unused storage space within allocated space 255(1) on thin-provisioned storage system 252. For example, identification module 106 from FIG. 1 may, as part of replication target 222 in FIG. 2, use a file-system API and/or application API to identify unused portion 259(1) within allocated space 255(1) on thin-provisioned storage system 252. Upon reclaiming this unused storage space (in the manner detailed below in connection with steps 406 and 408), replication agent 228 on replication target 222 may instruct replication source 202 to resume data replication.

Returning to FIG. 4, at step 406 the systems described herein may generate a reclamation request for reclaiming the unused storage space identified in step 404 from a thin-provisioned storage system that provides thin-provisioned storage for the replication target. For example, reclamation module 108 in FIG. 1 may, as part of replication target 222 in FIG. 2, generate a reclamation request for reclaiming unused portion 259(1) from thin-provisioned storage system 252. Similarly, reclamation module 108 from FIG. 1 may, as part of replication target 322 in FIG. 3, generate a reclamation request for reclaiming unused portion 359(1) from thin-provisioned storage system 352.

The systems described herein may perform step 406 in a variety of ways. In one example, reclamation module 108 may generate a reclamation request using a thin-provisioning API, such as APIs 240 and 340 in FIGS. 2 and 3.

At step 408, the systems described herein may issue the reclamation request to the thin-provisioned storage system in order to reclaim the unused storage space from the thin-provisioned storage system. For example, reclamation module 108 in FIG. 1 may, as part of replication target 222 in FIG. 2, issue the reclamation request generated at step 406 to thin-provisioned storage system 252 in order to reclaim unused portion 259(1). Similarly, reclamation module 108 in FIG. 1 may, as part of replication target 322 in FIG. 3, issue the reclamation request generated at step 406 to thin-provisioned storage system 352 in order to reclaim unused portion 359(1).

The systems described herein may perform step 408 in a variety of ways. In one example, reclamation module 108 may issue the reclamation request using a thin-provisioning API, such as APIs 240 and 340 in FIGS. 2 and 3. Upon completion of step 408, exemplary method 400 in FIG. 4 may terminate.

As detailed above, the systems and methods described herein may enable a replication target to reclaim unused storage space from a thin-provisioned storage system that provides thin-provisioned storage for the replication target. As such, these systems and methods may enable system administrators to deploy replication solutions within thin-provisioned storage environments, resulting in potential space and monetary savings.

Figure 5:
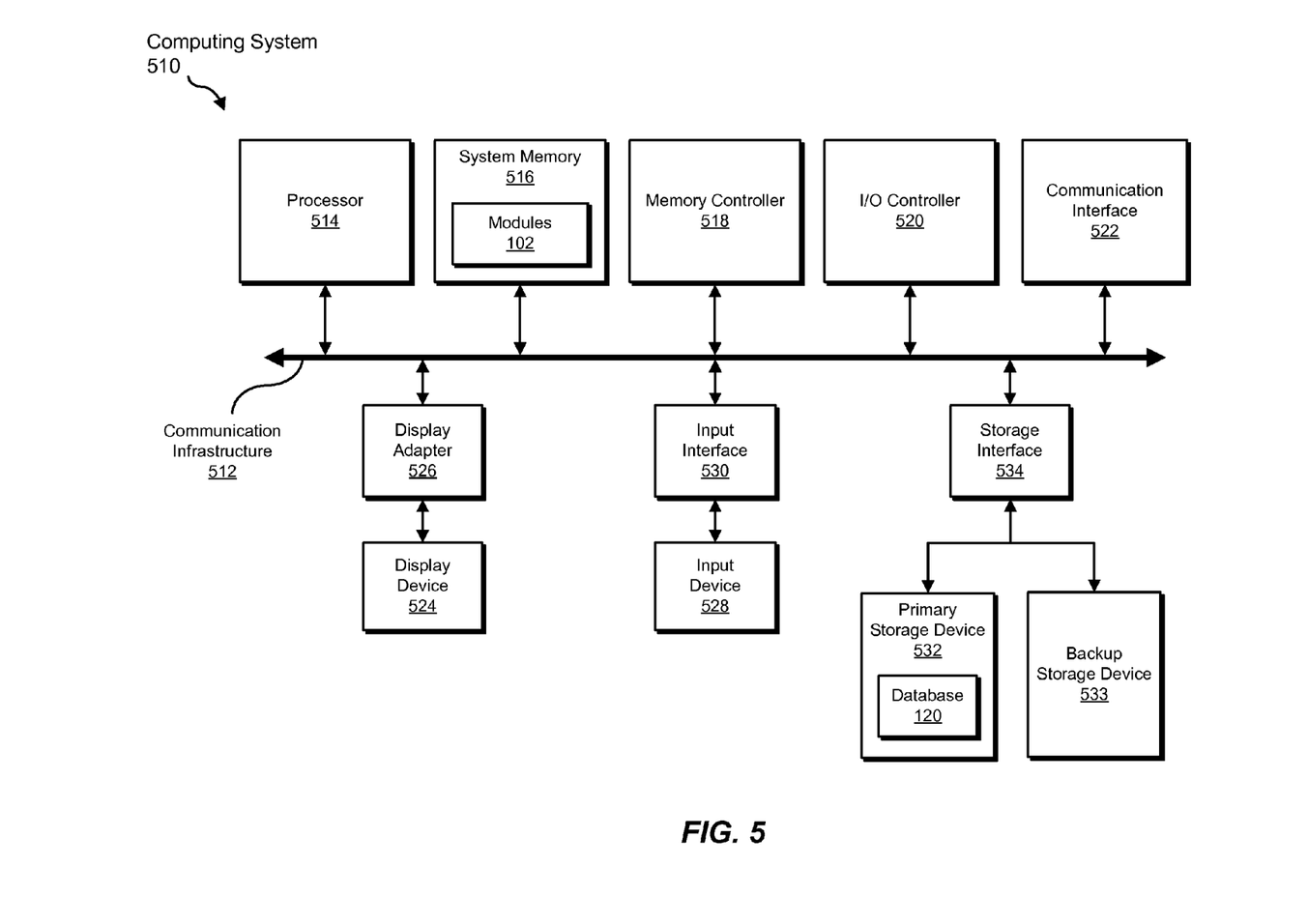
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multiprocessor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the replicating, identifying, generating, reclaiming, issuing, receiving, sending, requesting, suspending, using, and resuming steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as replicating, identifying, generating, reclaiming, issuing, receiving, sending, requesting, suspending, using, and resuming.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the replicating, identifying, generating, reclaiming, issuing, receiving, sending, requesting, suspending, using, and resuming steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the replicating, identifying, generating, reclaiming, issuing, receiving, sending, requesting, suspending, using, and resuming steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530.

Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the replicating, identifying, generating, reclaiming, issuing, receiving, sending, requesting, suspending, using, and resuming steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the replicating, identifying, generating, reclaiming, issuing, receiving, sending, requesting, suspending, using, and resuming steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
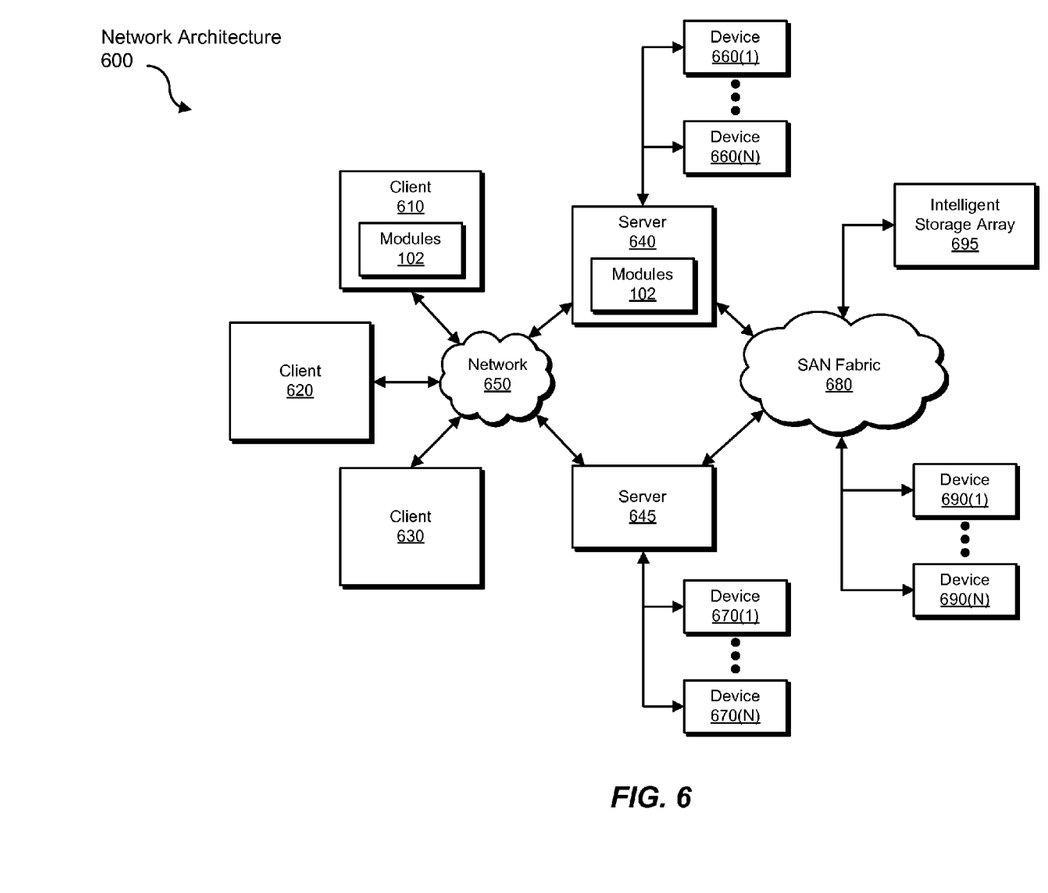
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include modules 102 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the replicating, identifying, generating, reclaiming, issuing, receiving, sending, requesting, suspending, using, and resuming steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for enabling replication targets to reclaim unused storage space on thin-provisioned storage systems. In one example, such a method may include: 1) replicating data from a replication source to a replication target, 2) identifying unused storage space within the replicated data, 3) generating a reclamation request for reclaiming the unused storage space from a thin-provisioned storage system that provides thin-provisioned storage for the replication target, and then 4) issuing the reclamation request to the thin-provisioned storage system in order to reclaim the unused storage space from the thin-provisioned storage system.

In some examples, replicating data from the replication source to the replication target may include replicating the data using a block-based and/or a file-based replication technique. In addition, the replication source may represent a server computing device and the replication target may represent a client computing device.

In one example, identifying unused storage space within the replicated data may include receiving information from the replication source that identifies the unused storage space. In some examples, this information may include an intercepted reclamation request originally sent from a replication source to a thin-provisioned storage system that provides thin-provisioned storage for the replication source. In other examples, this information may identify storage space freed by a computing operation performed at the replication source.

In some embodiments, receiving the information from the replication source may include receiving the information via an in-band communication protocol. Receiving the information from the replication source may also include: 1) requesting the information from the replication source and then 2) receiving the information from the replication source in response to the request. In some examples, requesting the information from the replication source may include requesting the information from the replication source on a periodic basis and/or on an as-needed basis.

In one example, identifying unused storage space within the replicated data may include: 1) suspending data replication and then 2) using a data-management API to identify unused storage space within a replicate of the data at the replication target. In this example, suspending data replication may include: 1) causing the replicated data at the replication source to enter a consistent state and then 2) receiving a communication from the replication source that indicates that the replicated data is in a consistent state. In this example, the method may also include resuming data replication upon issuing the reclamation request. The data-management API may include a file-system API and/or an application API.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, reclamation module 108 in FIG. 1 may transform a property or characteristic of thin-provisioned storage systems 252 and/or 353 in FIGS. 2 and 3 by reclaiming unused storage space (e.g., unused portions 259(1) and/or 359(1)) from thin-provisioned storage systems 252 and/or 352.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling replication targets to reclaim unused storage space on thin-provisioned storage systems, at least a portion of the method being performed by a computing device comprising at least one processor, the method comprising:
   receiving, at a replication target, replicated data from a replication source, wherein the replication target receives the replicated data from the replication source via a block-based replication technique that prevents the replication target from identifying unused storage space within the replicated data received from the replication source;
   identifying, at the replication target, unused storage space within the replicated data received from the replication source by receiving additional information from the replication source that identifies the unused storage space within the replicated data received from the replication source, wherein the additional information comprises an intercepted reclamation request originally sent from the replication source to a thin-provisioned storage system that provides thin-provisioned storage for the replication source;
   generating, at the replication target, a reclamation request for reclaiming the unused storage space within the replicated data received from the replication source from a thin-provisioned storage system that provides thin-provisioned storage for the replication target;
   issuing the reclamation request from the replication target to the thin-provisioned storage system that provides thin-provisioned storage for the replication target in order to reclaim the unused storage space within the replicated data received from the replication source from the thin-provisioned storage system that provides thin-provisioned storage for the replication target.

2. The method of claim 1, wherein:
   the unused storage space within the replicated data received from the replication source comprises storage space freed by a computing operation performed at the replication source;
   the additional information identifies the storage space freed by the computing operation performed at the replication source.

3. The method of claim 1, wherein receiving the additional information from the replication source comprises receiving the additional information via an in-band communication protocol.

4. The method of claim 1, wherein receiving the additional information from the replication source comprises:
   requesting the additional information from the replication source;
   receiving the additional information from the replication source in response to the request.

5. The method of claim 4, wherein requesting the additional information from the replication source comprises at least one of:
   requesting the additional information from the replication source on a periodic basis;
   requesting the additional information from the replication source on an as-needed basis.

6. The method of claim 1, wherein identifying unused storage space within the replicated data received from the replication source further comprises:
   suspending data replication;
   using a data-management API to identify unused storage space within the replicated data received from the replication source.

7. The method of claim 6, wherein suspending data replication comprises receiving a communication from the replication source that indicates that the replicated data is in a consistent state.

8. The method of claim 6, wherein the data-management API comprises at least one of:
   a file-system API;
   an application API.

9. The method of claim 6, further comprising, upon issuing the reclamation request, resuming data replication.

10. The method of claim 1, wherein:
    the replicated data received from the replication source comprises storage space allocated to the replication source;
    the unused storage space within the replicated data received from the replication source comprises an unused portion of the storage space allocated to the replication source.

11. A system for enabling replication targets to reclaim unused storage space on thin-provisioned storage systems, the system comprising:
    a replication module on a replication target programmed to receive replicated data from a replication source, wherein the replication module on the replication target receives the replicated data from the replication source via a block-based replication technique that prevents the replication target from identifying unused storage space within the replicated data received from the replication source;
    an identification module on the replication target programmed to identify unused storage space within the replicated data received from the replication source by receiving additional information from the replication source that identifies the unused storage space within the replicated data received from the replication source, wherein the additional information comprises an intercepted reclamation request originally sent from the replication source to a thin-provisioned storage system that provides thin-provisioned storage for the replication source;

a reclamation module on the replication target programmed to:

generate a reclamation request for reclaiming the unused storage space within the replicated data received from the replication source from a thin-provisioned storage system that provides thin-provisioned storage for the replication target;

issue the reclamation request to the thin-provisioned storage system that provides thin-provisioned storage for the replication target in order to reclaim the unused storage space within the replicated data received from the replication source from the thin-provisioned storage system that provides thin-provisioned storage for the replication target;

at least one processor configured to execute the replication module, the identification module, and the reclamation module.

12. The system of claim 11, wherein the additional information identifies storage space freed by a computing operation performed at the replication source.

13. The system of claim 11, wherein the reclamation module is further programmed to:

request the additional information from the replication source;

receive the additional information from the replication source in response to the request.

14. The system of claim 11, wherein:

the replication module is further programmed to suspend data replication;

the identification module identifies unused storage space within the replicated data received from the replication source by using a data-management API to identify unused storage space within the replicated data received from the replication source.

15. A non-transitory computer-readable-storage medium comprising computer-executable instructions that, when executed by at least one processor of a replication target, cause the replication target to:

receive replicated data from a replication source, wherein the replication target receives the replicated data from the replication source via a block-based replication technique that prevents the replication target from identifying unused storage space within the replicated data received from the replication source;

identify unused storage space within the replicated data received from the replication source by receiving additional information from the replication source that identifies the unused storage space within the replicated data received from the replication source, wherein the additional information comprises an intercepted reclamation request originally sent from the replication source to a thin-provisioned storage system that provides thin-provisioned storage for the replication source;

generate a reclamation request for reclaiming the unused storage space within the replicated data received from the replication source from a thin-provisioned storage system that provides thin-provisioned storage for the replication target;

issue the reclamation request to the thin-provisioned storage system that provides thin-provisioned storage for the replication target in order to reclaim the unused storage space within the replicated data received from the replication source from the thin-provisioned storage system that provides thin-provisioned storage for the replication target.

* * * * *